United States Patent Office 3,374,054
Patented Mar. 19, 1968

3,374,054
METHOD OF RECOVERING FLUORINE, ALUMINUM AND SODIUM COMPOUNDS FROM ELECTROLYTIC FURNACE WASTES
Sven Gregert Terjesen and Arnfinn Ve, Trondheim, Norway, assignors to Elektrokemisk A/S, a corporation of Norway
No Drawing. Continuation of application Ser. No. 548,337, May 6, 1966, which is a continuation of application Ser. No. 315,341, Oct. 10, 1963. This application June 16, 1967, Ser. No. 646,736
9 Claims. (Cl. 23—88)

This application is a continuation of our earlier filed application Ser. No. 548,337, filed May 6, 1966, now abandoned, which in turn is a continuation of our earlier filed application Ser. No. 315,341, filed Oct. 10, 1963, also now abandoned.

This invention relates to the recovery of valuable fluorine, aluminum and sodium compounds from aluminum electrolytic furnace wastes.

In the electrolytic production of aluminum it is known that certain waste materials, such as furnace waste gases, discarded carbonaceous furnace bottoms and linings from the furnace pot, cyclone dusts, so called black sludge from the gas scrubbers and flocculated material removed from the liquid furnace bath contain substantial quantities of fluorine, aluminum and sodium compounds. During operation of the furnace, the pot lining particularly will gradually absorb considerable amounts of the liquid bath components comprising fluorine, aluminum and sodium compounds, and these represent a considerable economic value which is ordinarily lost when the furnace wastes are discarded.

Certain processes have been proposed to recover these valuable compounds from the furnace wastes and among these is the leaching of the furnace wastes with alkaline solutions, then with acid solutions, followed by intermixing of the alkaline and acid solutions whereby cryolite ($Na_3AlF_6$) is precipitated. The chief drawback to this process is that accurate analysis of the alkaline and acid leaching solutions must be made to achieve a reasonable degree of precipitation. The quantitative determination of fluorine in the presence of aluminum is very difficult and requires much time, and therefore both solutions must be held up in storage before adjustments in either or both can be made and a satisfactory precipitation carried out. Furthermore, since extremely dilute solutions are used in the precipitation, very large storage containers are required for the solutions and this is also a disadvantage to the process.

Other processes have been proposed but these again suffer from the requirements for complete and difficult, time-consuming analyses, storage in large-capacity containers and delay in learning of what adjustments are necessary in the solutions involved.

Applicants have now devised a process for recovering valuable fluorine, aluminum and sodium compounds from furnace wastes which eliminates the troublesome analyses that were previously required as described above and which does not require a large storage capacity for greatly diluted solutions. In accordance with the method of the invention, the furnace wastes are leached with a solution of alkali, for example alkali metal hydroxides and cryolite is precipitated from this solution in two separate and distinct steps, first in an alkaline pH by contact with a hydrogen fluoride-containing liquid and then in an acid pH by contact with an aluminum trifluoride-containing liquid. It has been found that with such a two step process, aluminum can be first precipitated quantitatively from the alkaline solution in the form of so-called "basic aluminum," leaving a large excess of sodium and fluorine.

Thereafter when the second precipitation is effected in an acid pH, the remaining quantities of sodium and fluorine precipitate out together with the added amount of aluminum trifluoride.

Because the liquor remaining after the first precipitation step in alkaline pH is easily analyzed for fluorine by measurement of the electrical conductivity, the liquor may be immediately pumped to the second precipitation step and the quantity of aluminum trifluoride solution required will be known immediately. The supply of aluminum trifluoride solution can alternatively be controlled, in the second precipitation step, by testing samples of the mother liquor from the first precipitation to determine at what point addition of a further increment of trifluoride solution will not cause further precipitation to occur. In either case, long storage periods and the requirement for storage capacities are eliminated and the entire process may be carried on continuously. Furthermore, with an accurate supply of aluminum trifluoride solution in the second precipitation step in acid pH, virtually 98% of all of the fluorine in the leach liquor and the added hydrogen fluoride containing solution can be recovered and returned to the liquid bath in the aluminum electrolytic furnace to reduce the requirement for fresh cryolite.

In carrying out the process of the invention the furnace wastes, such as furnace pot bottoms and linings and other perishable elements of the furnace which absorb aluminum, fluorine and sodium compounds, are preferably crushed to small particles so as to increase the efficiency of the leaching operation, for example, to an average particle diameter of 3 mm. or less. Thereafter, an aqueous solution of alkali, for example, sodium hydroxide in a concentration of 0.66% by weight is mixed with the crushed furnace wastes, preferably with agitation so that the fluorine, aluminum and sodium compounds may be extracted from the furnace wastes. If desired, the leaching liquid can be the recycled liquor from which cryolite has already been precipitated in accordance with the invention and to which have been added the required amount of sodium hydroxide. This particular procedure gives a closed loop operation in which very little, if any, additional water or liquid leaching medium need be added to the system. The leaching of the furnace wastes with sodium hydroxide solution may be carried out in conventional manner and the insoluble furnace wastes are thereafter removed from the leach liquor as by filtration.

Following removal of the insoluble material the leach liquor is subjected to precipitation in an alkaline pH in the range of 7.5 to 13. and preferably at 10 to 11. The precipitation is carried out by contacting the alkaline leach liquor with a hydrogen fluoride-containing aqueous liquid, for example, tower acid or an aqueous solution of hydrogen fluoride. As previously noted, tower acid is the aqueous liquid absorbent obtained in the gas scrubbers which are connected to the aluminum electrolytic furnace. In these scrubbers, the off gases from the furnace are washed with water to remove volatile fluorides and other noxious materials.

In the first precipitation step, the hydrogen fluoride-containing liquid is supplied in such proportions that from 5.0 to 6 equivalent weights of hydrogen fluoride are added for each equivalent weight of aluminum in the alkaline leach liquor. The concentration of hydrogen fluoride in the aqueous liquid, by which it is to be supplied, may vary considerably from about 2% to about 20% or more and generally speaking as the concentration of HF increases less of the liquid may be mixed with the alkaline leach liquor to supply the required number of equivalents of hydrogen fluoride.

The hydrogen fluoride-containing liquid is supplied to the alkaline leach liquor preferably while the entire liquid is being agitated and precipitation of so-called basic aluminum takes place. The mother liquor together with the precipitated cryolite is then subjected to a second precipitation, this time in an acid medium.

In the second precipitation step, the liquor is contacted with an aqueous solution of aluminum trifluoride formed by dissolving aluminum hydroxide in the same hydrogen fluoride-containing liquid as used in the first precipitation step or in any other hydrogen fluoride-containing liquid. The quantity of aluminum hydroxide dissolved in the hydrogen fluoride-containing liquid will be stoichiometric as required to form aluminum trifluoride in accordance with the equation:

$$3HF + Al(OH)_3 \rightarrow AlF_3 + 3H_2O$$

Together with the aluminum trifluoride containing solution is also added an amount of hydrogen fluoride solution whereby the mixture is adjusted to a pH within the range of about 2 to 6.5, and preferably 4 to 5.

At this point, there will be a slight excess of sodium fluoride in the liquor but substantially all of the cryolite originally extracted in the alkaline leach liquor will have been precipitated. After separation of the precipitate from the second acid precipitation step, the remaining leach liquor may be desirably recycled so that additional sodium hydroxide may be added for leaching additional crushed furnace wastes in accordance with the process. Before the liquid is so recycled, it is preferable to remove any residual amounts of carbon dioxide contained in the liquid since otherwise a portion of the sodium hydroxide to be added will be reacted to sodium carbonate and thereby wasted. This will increase the cost of the process and in time result in excessive consumption of sodium hydroxide. For this reason, we prefer to remove carbon dioxide by any conventional means as by stripping the carbon dioxide in scrubbing towers containing an alkaline substance. Also, the leach liquors to be recycled usually contain small quantities of dissolved sodium fluoride which are unavoidable as the precipitation following in the alkaline and acid stages is not 100% complete. However, this small quantity of dissolved sodium fluoride does not in any way interfere with the operation of the process.

The invention will be further illustrated in the following specific example which represents a preferred embodiment thereof:

*Example 1*

1055 kgs. of furnace bottoms containing substantial quantities of sodium, aluminum and fluorine compounds were crushed to particles averaging about 3 mm. in diameter or less. The crushed furnace bottoms were leached with 12,850 liters of a recycle liquor which contained approximately 8 kgs. of sodium fluoride and to which had been separately added 151 liters of a 40% (by weight) aqueous sodium hydroxide solution. After removal of the insolubles by filtration and washing, 13,000 liters of leach liquor was obtained which contained 90.3 kgs. of fluorine, 21.3 kgs. of aluminum and 155.5 kgs. of sodium. Thus, approximately 86.8 kgs. of fluorine, 21.3 kgs. of aluminum and 101.5 kgs. of sodium, all economically valuable materials, were extracted from the furnace bottoms by the leach liquor.

The leach liquor was subjected to a first precipitation step by mixing it at a pH between 10 and 11 with approximately 2,660 liters of tower acid which contained 3% by weight of hydrogen fluoride and small amounts of sodium and aluminum. The tower acid was obtained from gas scrubbers connected to the aluminum electrolytic furnaces in which scrubbers the furnace waste gases are washed with water to remove volatile fluorides and other noxious materials. The tower acid supplied slightly more than 80 kgs. of hydrogen fluoride or a little more than 5.0 kgs. of equivalents for kg. equivalent of aluminum contained in the leach liquor. On mixing of the two liquids, a major proportion of the aluminum in the leach liquor was precipitated as cryolite.

The mother liquor together with the precipitated cryolite was subjected to a second precipitation step by mixing it at a pH between 4 and 5 with 2,840 liters of a weakly acidic aqueous solution of aluminum trifluoride. This solution was formed by dissolving 101 kgs. of aluminum hydroxide in 2,840 liters of the previously-mentioned tower acid containing 3% by weight of hydrogen fluoride. On mixing of the two liquids at acid pH, additional cryolite precipitated and a total of 470 kgs. of cryolite was recovered from both precipitations. This represents approximately 75% of the total original amount of fluorine that was contained in the crushed furnace bottoms and in the tower acid, and substantially 100% of the sodium, fluorine and aluminium that was contained in the leach liquor and in the first and second precipitating liquids.

After separation of the second precipitate by filtration, 13,000 liters of the remaining liquor was washed in conventional $CO_2$-stripping towers to remove residual quantities of $CO_2$ contained therein and then the liquor was recycled for incorporation of sodium hydroxide and reuse as the leaching liquor for additional crushed furnace bottoms.

It will be understood that it is intended to cover all changes and modifications of the preferred embodiments of the invention herein chosen for the purpose of illustration which do not constitute departures from the spirit and scope of the invention.

We claim:

1. The method of recovering fluorine, aluminum and sodium compounds from aluminum electrolytic furnace wastes which comprises leaching said furnace wastes with an aqueous solution of alkali to extract said fluorine, aluminum and sodium compounds, mixing with the leach liquor at a pH from 7.5 to 13 a liquid containing hydrogen fluoride to form a precipitate of said fluorine, aluminum and sodium compounds without determining in advance the precise quantities of said compounds that are dissolved in said leach liquor, then mixing with the resulting precipitate-containing liquor at a pH from 2.0 to 5 a liquid containing aluminum trifluoride to form a further precipitate of said fluorine, aluminum and sodium compounds again without determining in advance the precise quantities of said compounds that are still dissolved in said precipitate-containing liquor, whereby substantially all of the fluorine, aluminum and sodium in said leach liquor and in said first and second liquids is recovered.

2. A method as in claim 1 which includes the step of crushing said furnace wastes to small particles prior to the leaching thereof.

3. A method as in claim 1 which includes the step of recycling the mother liquor remaining after formation of the second precipitate for use in leaching additional furnace wastes.

4. A method as in claim 3 which includes the step of removing any residual carbon dioxide which may be contained in said mother liquor prior to the recycling thereof.

5. A method as in claim 1 wherein said liquid containing hydrogen fluoride is obtained from gas scrubbers connected to aluminum electrolytic furnaces and contains about 3% by weight of hydrogen fluoride.

6. A method as in claim 1 wherein said liquid containing aluminum trifluoride is obtained by dissolving aluminum hydroxide in a liquid containing about 3% by weight of hydrogen fluoride.

7. A method as in claim 1 which is carried on continuously.

8. A method of recovering fluorine, aluminum and sodium compounds from aluminum electrolytic furnace wastes which comprises leaching said furnace wastes with an aqueous solution of alkali to extract said fluorine, aluminum and sodium compounds, mixing with the leach liquor at a pH from about 10 to about 11 a liquid containing hydrogen fluoride to form a precipitate of said fluorine, aluminum and sodium compounds without determining in advance the precise quantities of said compounds that are dissolved in said leach liquor, mixing with the resulting precipitate-containing liquor at a pH from about 4 to about 5 a liquid containing aluminum trifluoride to form a further precipitate of said fluorine, aluminum and sodium compounds again without determining in advance the precise quantities of said compounds that are still dissolved in said precipitate-containing liquor, separating said precipitates from the liquor and recycling said liquor for use in leaching additional furnace wastes, whereby substantially all of the fluorine, aluminum and sodium in said leach liquor and in said first and second liquids is recovered.

9. The method of recovering fluorine, aluminum and sodium compounds from aluminum electrolytic furnace wastes which comprises leaching said furnace wastes with an aqueous solution of alkali to extract said fluorine, aluminum and sodium compounds, mixing with the leach liquor at a pH from 7.5 to 13 a liquid containing hydrogen fluoride to form a precipitate of said fluorine, aluminum and sodium compounds without determining in advance the precise quantities of said compounds that are dissolved in said leach liquor, then mixing with the resulting precipitate-containing liquor at a pH from 2.0 to 6.0 a liquid containing aluminum trifluoride to form a further precipitate of said fluorine, aluminum and sodium compounds again without determining in advance the precise quantities of said compounds that are still dissolved in said precipitate-containing liquor, whereby substantially all of the fluorine, aluminum and sodium in said leach liquor and in said first and second liquids is recovered.

No references cited.

OSCAR R. VERTIZ, *Primary Examiner.*

EDWARD STERN, *Examiner.*